United States Patent Office 3,636,074
Patented Jan. 18, 1972

3,636,074
NOVEL MERCAPTOPHENOL DERIVATIVES
Emil J. Geering, Grand Island, and Norman W. Dachs,
Buffalo, N.Y., assignors to Hooker Chemical Corporation, Niagara Falls, N.Y.
No Drawing. Filed Aug. 5, 1968, Ser. No. 749,954
Int. Cl. C07c 149/40
U.S. Cl. 260—470    17 Claims

ABSTRACT OF THE DISCLOSURE

There are described novel hydroxyarylthio ethylene and ethane derivatives containing in the position β to the hydroxyarylthio radical a cyano, nitro, aromatic, carbonyl, sulfonyl, sulfinyl, phosphinyl or phosphinothioyl radical. A process for the preparation of said compositions, their pesticidal utility and pesticidal carbamate and phosphorothioate derivatives are also described.

---

This invention relates to novel hydroxyarylthio compounds and a process for preparing said compounds by the reaction of mercaptophenols with reactive unsaturated compounds.

The addition of mercaptans to olefins is well known. This reaction is described by E. Emmet Reid in Organic Chemistry of Bivalent Sulfur, vol. 11. Chemical Publishing Co., N.Y.C., 1960, pp. 29–34. Mercaptans add more readily to unsaturated bonds adjacent to electron-accepting groups such as carbonyl. Unsaturated reagents of this type can be classed as Michael reaction acceptors. (The Michael Reaction is described by E. O. Bergmann, O. Gensbury and R. Pappo in Organic Reactions, vol. 10, John Wiley & Sons, New York, 1959). The scope of the reaction of mercaptans and these reactive unsaturated compounds encompasses a wide variety of reagents as revealed in the literature. A few representative references include: C. D. Hurd and L. L. Gershhein (J. Am. Chem. Soc., 69, 2328–2335, 1947) added mercaptans, including alkanethiols, mercaptoethanol, thiophenol, mercapto-substituted carboxylic acids and esters, and benzyl mercaptan to reactive olefins including acrylonitrile, methyl acrylate, acrolein and crotonaldehyde; and F. B. Zienty, et al. (J. of Org. Chem., 31, 865–869, 1966) prepared adducts from β-morpholinoethanethiol and α,β-unsaturated ketones, esters, nitriles and others.

The reactive unsaturated starting compounds of the present invention enter into reactions with phenol. These reactants include α,β-unsaturated aldehydes, ketones, esters and sulfones. Aldehydes and ketones give condensation products with phenol, such as phenolformaldehyde resins or 4,4-isopropylidene diphenol (bisphenol). Mercaptophenols having the hydroxyl and mercapto groups on adjacent carbons form cyclic products with carbonyl compounds. Phenyl esters are formed by acetylation or transesterification of phenol with, for example, citraconic anhydride, fumaryl chloride or ethyl acrylate. Phenol ethers are formed by the addition of a phenolic hydroxyl across a reactive double bond; thus bis(2-phenoxyethyl) sulfone or β-phenoxycyanoethane are formed by the addition of phenol to divinyl sulfone or acrylonitrile. As phenols are readily alkylated by olefins, mercaptophenol similarly could also be expected to become alkylated by olefins.

Mercaptophenol is not only a mercaptan, but it is also a phenol and therefore has both a reactive hydroxyl group and a reactive ring. One might expect the above alternate reactions to take precedent over the addition of the mercaptan group to an unsaturated bond. One could not predict that the compounds of this invention would be produced by the reaction of a mercaptophenol and a reactive olefin or an acetylene.

In accordance with the present invention there are provided novel compounds of the formulae:

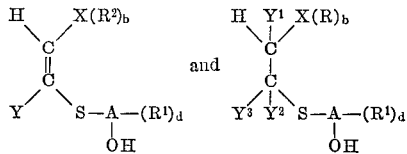

wherein:
(a) b is from zero to two inclusive and d is from zero to about six;
(b) provided that:
 (1) when b is zero, X is selected from the group consisting of cyano, nitro and aromatic radicals;
 (2) when b is one, X is selected from the group consisting of carbonyl, sulfonyl and sulfinyl;
 (3) when b is two, X is selected from the group consisting of phosphinyl and phosphinothioyl;
(c) R is from zero to about 20 carbon atoms and is selected from the group consisting of alkyl, aralkyl, alkaryl, aryl, carbalkoxy, carbaryloxy, alkoxy, aryloxy, alkylthio, arylthio, hydrogen, hydroxy, amino, cyano, carboxy,

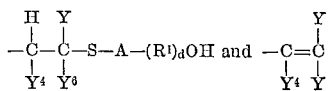

(d) $R^2$ is selected from the group consisting of R and —C≡C—$Y^6$;
(e) $Y^4$ and $Y^6$ are independently selected from the group consisting of hydrogen, halogen, alkyl, aralkyl and alkaryl of zero to about 20 carbon atoms;
(f) $Y^5$ is selected from the group consisting of $Y^6$ and —S—A—$(R^1)_d$OH, provided that when $Y^5$ is
 —S—A—$(R^1)_d$OH
$Y^4$ is hydrogen;
(g) Y is selected from the group consisting of $Y^6$ and $X(R^2)_b$;
(h) $Y^3$ is selected from the group consisting of $Y^6$ and $X(R)_b$;
(i) $Y^1$ and $Y^2$ are independently selected from the group consisting of $Y^6$, $X(R)_b$ and —S—A—$(R^1)_d$OH; provided that:
 (1) when $Y^1$ is —S—A—$(R^1)_d$OH, $Y^2$ is $X(R)_b$ and $Y^3$ is hydrogen;
 (2) when $Y^2$ is —S—A—$(R^1)_d$OH, $Y^1$ is hydrogen;
(j) $R^1$ is of zero to about 20 carbon atoms and is selected from the group consisting of alkyl, aralkyl, alkaryl, aryl, carbalkoxy, carbaryloxy, alkoxy, aryloxy, alkylthio, arylthio, hydroxy, amino, mercapto, cyano, carboxy and halogen; and
(k) A is aryl of six to about 18 carbon atoms.

Also, in accordance with the present invention, there are provided a process for the preparation of said compositions, a pesticidal utility and novel pesticidal derivatives.

The following list is illustrative of those compounds included within the scope of the present invention, additional such compounds being described in the working examples.

2-(-hydroxyphenylthio)acrylonitrile
2-(4-hydroxyphenylthio)nitroethane
diethyl 2-hydroxymethyl-2-(4-hydroxyphenylthio)vinyl phosphate
ethyl 2-(2-hydroxy-3-chlorophenylthio)vinyl ketone
4,5-diphenyl-4-(4-hydroxyphenylthio)octane
2-(2,5-dihydroxyphenylthio)butyric acid
1-ethyl-1-(4-hydroxyphenylthio)maleimide
1,6-bis(2-hydroxyphenylthio)-3,4-hexanedione
bis[2-chloro-2-(4-hydroxyphenylthio)ethyl]sulfoxide 3,5-dicyano-1,7-(bis(4-hydroxyphenylthio)heptane
2,2-bis(2-hydroxyphenylthio)propionitrile
phenyl 2-(3-methyl-4-hydroxyphenylthio)propionate
1,1-bis(2-hydroxy-3,5-di-t-butylphenylthio)-3-butanone
tetracyano(2-hydroxy-5-chlorophenylthio)ethane
2,6-dis(2-hydroxy-3-t-butyl-5-methylphenylthio)-2,6-dimethyl-4-heptanone
diethyl 2-(2-hydroxyphenylthio)ethyl phosphonate
tris(2-hydroxyphenylthioethyl)phosphine oxide
2-(2-nitrocyclohexylthio)phenol
2-(2-hydroxyphenylthio)butyraldehyde
dimethyl 1,2-bis(2-hydroxyphenylthio)succinate
2-(2-hydroxyphenylthio)ethanesulfonic acid In the compositions of the present invention —X(R)$_b$ is an activating group that promotes the addition reaction of a mercaptophenol to an unsaturated carbon-carbon bond.

When X is an aromatic radical, it may contain up to about three fused rings and may be carbocyclic or a heterocyclic ring containing nitrogen, sulfur or oxygen in addition to carbon. Typical examples of aromatic radicals are furyl, thienyl, pyridyl, phenyl, benzothienyl, quinoxalyl, naphthyl, anthryl and carbazyl.

When $b$ is one, X is preferably sulfonyl or carbonyl. Preferably R is alkyl, aryl, alkoxy, aryloxy, amino or —CHY$^4$—CY$^5$Y$^6$—S—A—(R$^1$)$_d$OH, and preferably R is from zero to about ten carbon atoms.

A is preferably phenyl, and R$^1$, a substituent on the aryl nucleus, A, is preferably alkyl, aryl, halogen or hydroxy. When A is phenyl, $d$ is from zero to four, preferably from zero to two.

In the compositions of the present invention, Y, Y$^1$, Y$^2$, Y$^3$, Y$^4$, Y$^5$ and Y$^6$ are noninterfering substituents and are preferably of zero to about ten carbon atoms. Y$^4$ and Y$^6$ are preferably hydrogen or alkyl, and Y, Y$^1$, Y$^2$, Y$^3$, Y$^4$, Y$^5$ and Y$^6$ are even more preferably hydrogen or alkyl.

When R$^1$ or any one of the seven Y substituents is halogen, it may be chlorine, fluorine, bromine or iodine.

The unsaturated compounds that may be used as starting materials in the preparation of the compounds of the present invention are of the following formulae:

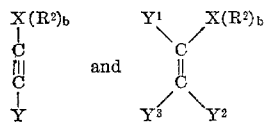

The subscript $b$ and R$^2$, Y, Y$^1$, Y$^2$, Y$^3$ and X are as hereinbefore described.

In general said starting materials are described as a compound containing the group, X(R$^2$)$_b$ adjacent to an unsaturated carbon-carbon bond.

(1) when $b$ is zero and X is cyano:
   1-cyanodecene-1, acrylonitrile, 1,2-dicyanoethylene, tetracyanoethylene, 3-cyanocyclohexane;
(2) when $b$ is zero and X is nitro:
   nitromalonaldehyde (the enol form), nitroethylene, 1 - nitroisobutylene, β - nitrostyrene, 1-nitrocyclohexene, 1-nitro-4-cyanobutene-1, and 1-chloro-3-nitro-2-butene;
(3) when $b$ is zero and X is aromatic:
   4-phenoxyvinylbenzene, phenylacetylene, styrene, β-chlorostyrene, 2 - vinylpyridene, 2 - (α-propenyl) pyridine, 1-vinylnapthalene and 2-vinylthiophene;
(4) when $b$ is one and X is carbonyl:
   acrolein, β-ethoxyacrolein, crotonaldehyde, citral, cinnamaledehyde, phorone, methyl vinyl ketone, divinyl ketone, mesityl oxide, methyl isopropenyl ketone, 2 - benzylidenecyclohexanone, chalcone, furfurylideneacetophenone, carvone, isophorone, 2 - methylcyclohexane - 1,3 - dione (enol form), benzoyl acetone (enol form), 5-hydroxy-3-methyl-3-penten-2-one, methyl ethynyl ketone, 3-butyn-2-one, 5-hydroxy-3-pentene-2-one, phenyl propiolate, 4-nitrophenyl propiolate, benzyl propiolate, diethyl acetylenedicarboxylate, dimethyl maleic acid, dimethyl maleate, dioctyl fumarate, diphenyl itaconate, butyl acrylate, benzyl methacrylate, dodecyl cinnamate, dimethyl(2 - hydroxyphenylthio)maleate, ethyl α-cyanocinnamate, S-methylthioacrylate, S-benzylmethylthioaceylate, acrylic acid, thioacrylic acid, propiolamide, acetylenedicarboxyamide, acrylamide;
(5) when $b$ is 1 and X sulfinyl or sulfonyl:
   ethylenesulfinic acid, ethylenesulfonic acid, methyl vinyl sulfoxide, divinyl sulfone, phenyl styryl sulfone, methyl ethylenesulfonate, phenyl 3-propylenesulfonate, methyl ethylenesulfinate, ethylenesulfonic acid, N-ethylanilide;
(6) when $b$ is two and X is phosphinyl or phosphinothioyl:
   dimethyl vinyl phosphine oxide, vinyl diphenyl phosphine sulfide, diethyl vinylphosphonate, methyl methylvinylphosphinate and dimethyl ethynylphosphonate.

The starting mercaptophenol compositions of the present invention are of the formula: HS—A—(R$^1$)$_d$OH; wherein A, R$^1$ and $d$ are hereinbefore described. Said compositions may be prepared by methods known in the prior art or by the procedure described in copending application Ser. No. 597,228, filed Nov. 28, 1966, now Pat. No. 3,468,961 granted on Sept. 23, 1969.

Two sets of reactions illustrate the processes for the preparation of the novel compositions of the present invention.

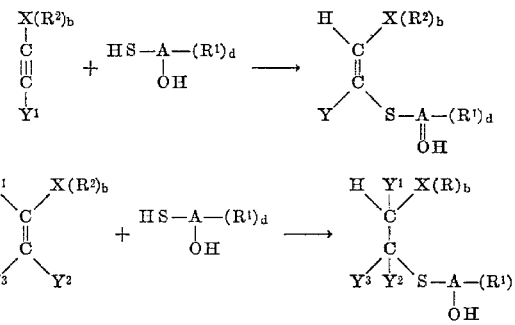

The starting compositions and novel compositions of the present invention are as hereinbefore described.

Although the reactions may be conducted in the absence of a solvent, they are normally conducted in the presence of a solvent. Typical solvents include benzene, toluene, xylene, heptane, hexane, chloroform, carbon tetrachloride, chlorobenzene, ethanol, t-butanol, acetic acid, dioxane, N,N-dimethylformamide, N-methyl-2-pyrrolidone, tetrahydrofuran and dimethylsulfoxide.

Although the reactions may be conducted at a temperature of about zero to about 200 degrees centigrade, the preferred temperature is from about 10 to about 150 degrees centigrade.

Although the reactions may be conducted in the absence of a catalyst, the time and temperature required to complete the reactions may generally be reduced by using a basic catalyst. Suitable catalysts include salts of strong bases and alcohols or weak acids, amines, quaternary amine bases and alkali or alkaline earth metals or hydroxides. Examples of catalyst are sodium methylate, sodium acetate, potassium carbonate, triethylamine, piperidine, triethylene diamine, trimethylbenzylammonium hydroxide, and sodium or magnesium metal and sodium hydroxide.

Pesticidal derivatives of the present invention are prepared by reacting the compositions of the present invention with 0,0-dialkylphosphorochloridothioate or alkyl isocyanates wherein the alkyl radical is of one to about five carbon atoms.

The compositions of the present invention and derivatives thereof are particularly useful for the control of animal or plant pests. They possess certain insecticidal activity such as toxicity toward mites and the like, bactericidal activity against *Staphylococcus aureus* and *Xanthomonas phaseoli* and the like.

Preparations containing the compositions of the present invention and/or derivatives thereof are conveniently made up as liquid or as solid formulations and as such they exhibit pesticidal activity. Examples of solid formulations are dusts, wettable powders, granules and pellets, which may contain a solid extender or carrier, such as sand, clays, talcs, sawdust and the like. Where liquid formulations are desirable, liquid extenders, diluents, or carriers of a nonreactive nature are generally utilized, such as water, alcohols, glycols, petroleum distillates, and the like.

The compounds of this invention are useful as pesticides and as chemical intermediates. Because of unsaturation, the ethylene hydroxyarylthio compositions of the present invention are especially useful as intermediates. By conventional hydrogenation or halogenation processes or by the process of the present invention, said compositions may be used as starting products for the preparation of the novel ethane hydroxyarylthio compositions of the present invention. All temperatures are in degrees centigrade and all parts are by weight, unless otherwise indicated.

EXAMPLE 1

To a solution of 13.0 parts of o-mercaptophenol and 0.4 part of triethylene diamine, 7.0 parts of methyl vinyl ketone were added. The addition takes place over a period of about 10 minutes and during said addition the temperature rose to 50–60 degrees centigrade. The temperature was reduced to and maintained at 25 degrees centigrade by means of an ice bath. After an overnight storage, the reaction mixture was filtered. Concentration of the filtrate and recrystallization of the product from toluene resulted in the formation of 20.4 parts of product, representing a yield of 98%. The white crystalline product has a melting point of 47–49 degrees centigrade. Found: C, 61.1%; H, 6.6%. Calculated for $C_{10}H_{12}O_2S$: C, 61.2 percent; H, 6.16 percent. The product was identified as having the formula:

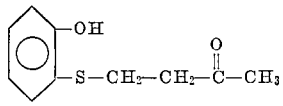

In a similar manner, compositions of the following formulae:

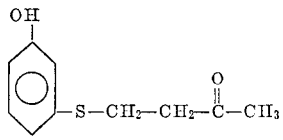

and

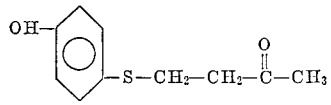

are prepared in comparable yields by the reaction of methyl vinyl ketone with m-mercaptophenol and p-mercaptophenol respectively.

EXAMPLE 2

To 19.5 parts (0.15 mole) of o-mercaptophenol, 0.7 part of triethylenediamine and 15 parts of methyl methacrylate were added. An exothermic reaction ensued. After stirring overnight, a light yellow oil was isolated. Found: S, 13.32 percent. Calculated for $C_{11}H_{14}O_2S$: S, 14.13 percent. The compound was identified as having the formula

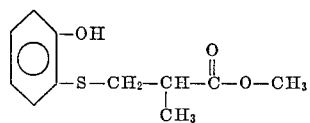

EXAMPLE 3

To 13.0 parts of o-mercaptophenol and 0.44 parts of triethylene diamine, 10 parts of ethyl acrylate was added dropwise while the temperature was maintained at about 55–60 degrees centigrade with an ice bath. There was obtained 23.6 parts of a pale yellow liquid. Found: S, 13.34 percent. Calculated for $C_{11}H_{14}O_3S$: S, 14.16 percent. The compound was identified as having the formula

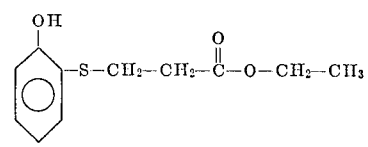

EXAMPLE 4

To 13 parts of o-mercaptophenol and 0.54 part of triethylene diamine, 14.4 parts of dimethyl maleate were added dropwise while maintaining the temperature of the reaction mixture at about 40–50 degrees centigrade. The product was isolated as a water-white liquid. Found: S, 11.15 percent. Calculated for $C_{12}H_{14}O_5S$: S, 11.84 percent. The compound was identified as having the formula

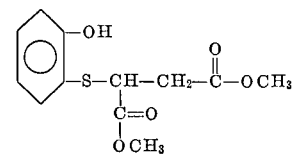

EXAMPLES 5–15

In Examples 5–15 the basic procedure specified in Example 1 was followed, but different reactants were used, as specified in Table I.

In Examples 16–34, the hydroxyarylthio compositions and derivatives thereof were subjected to tests to determine whether they possess pesticidal activity. The following test methods were used.

TABLE I.—ADDUCTS OF ORTHO-MERCAPTO PHENOL AND REACTIVE OLEFINS

| | | | | Percentages | | | | | | | |
|---|---|---|---|---|---|---|---|---|---|---|---|
| | | | | Calculated | | | | Found | | | |
| Example | Olefin | °C. M.P. or B.P./mm., | Product formula | C | H | S | OH | C | H | S | OH |
| 5 | Ethyl maleate [1] | 136–140/0.03 | $C_{14}H_{18}O_5S$ | 56.36 | 6.08 | 10.75 | 5.69 | 56.25 | 6.11 | 10.7 | 5.69 |
| 6 | Ethyl fumarate | 148–149/0.05 | $C_{14}H_{18}O_5S$ | 56.36 | 6.08 | 10.75 | 5.69 | 56.17 | 5.89 | 10.8 | 5.84 |
| 7 | Butyl acrylate | 116–119/0.01 | $C_{13}H_{18}O_3S$ | 61.39 | 7.13 | 12.61 | 6.68 | 60.98 | 7.18 | 12.6 | 6.71 |
| 8 | Ethyl methacrylate | 106/0.08 | $C_{12}H_{16}O_3S$ | 59.97 | 6.71 | 13.34 | 7.00 | 59.93 | 6.89 | 13.4 | 7.13 |
| 9 | Mesityl oxide | 55–57 | $C_{12}H_{16}O_2S$ | 64.25 | 7.19 | 14.30 | 7.57 | 64.25 | 7.29 | 14.2 | 7.05 |
| 10 | Acrylamide | 72–73 | $C_9H_{11}NO_2S$ | 54.82 | 5.58 | 16.26 | 8.62 | 54.65 | 5.61 | 15.8 | 8.66 |
| 11 | Acrylonitrile | 130/0.06 | $C_9H_9NOS$ | 60.31 | 5.06 | 17.89 | 9.47 | 59.93 | 4.90 | 17.8 | 9.34 |
| 12 | Dimethyl acetylene dicarboxylate | 159.5–161.5 | $C_{13}H_{13}O_5S_2$ | 54.81 | 4.60 | 16.3 | 4.30(8.60) | 54.60 | 4.75 | 15.8 | 4.14(8.60) |
| 13 | 4-vinyl pyridine | 143.5–144.5 | $C_{13}H_{13}NOS$ | 67.50 | 5.66 | 13.86 | 7.4 | 67.23 | 5.65 | 14.0 | 6.7 |
| 14 | Divinyl sulfone | 159.8–160.3 | $C_{16}H_{18}O_4S_3$ | 51.87 | 4.90 | 25.96 | 4.59(9.18) | 51.81 | 4.89 | 25.8 | 4.83(9.21) |
| 15 | Styrene | 117–120/0.05 | $C_{14}H_{14}OS$ | 72.8 | 6.1 | 13.9 | 4.35 | 71.3 | 5.9 | 14.5 | 4.48 |

[1] Ethyl maleate and ethyl fumarate form the same adduct.

INSECTICIDE TEST

Aphid test

Ten-day-old Nasturtium plants were infested with black bean aphids (*Aphis fabae* Scop.) so that the first two leaves have from 50–100 aphids, sprayed with the chemical to be tested, and caged in a piece of tubing which was coated with talcum powder to prevent the escape of the aphids. Mortality was recorded by counting the number of dead aphids.

Mite test

Young pole lima bean plants (Sieva variety) were infested with 50 to 100 adult mites (*Tetranychus telarius* L.) on both primary leaves, sprayed 24 hours thereafter with the chemical to be tested, and placed in the green house for from 24 to 48 hours, after which mortality was recorded by counting the number of dead mites.

Mexican bean beetle test

Primary leaves of lima bean plants were excised, dipped into a solution of the chemical to be tested, and dried. Then five larva (fourth instar) of the Mexican bean beetle (*Epilachna varivestis* Muls.) were placed thereon, and the leaves were so enclosed that the insects could not escape. Mortality was recorded by counting the number of dead larvae, and the percent leaf consumed by the larvae was estimated.

House fly test

Newly hatched adult house flies (*Musca domestica* L.) were, while under the action of carbon dioxide, immersed in the chemical solution to be tested, shaken for a few seconds, and screened out into a paper cup containing filter paper which was dipped in sugar solution, said cups then being covered to prevent the escape of the flies. Ten flies were used per treatment. Data is taken on the number of flies knocked down in two hours, and killed in 24 hours.

Bactericidal test

The bacteria to be tested were grown on agar slants for 20 hours. To a mixture of the chemical to be tested and nutrient agar was added two drops of the bacterial suspension, and this mixture was shaken and then poured onto sterilized Petri plates. The plates were incubated for 24 hours, and the bacterial growth noted.

EXAMPLE 16

The hydroxyarylthio composition of the formula

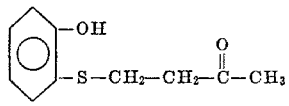

exhibited completed control of the bacteria *Staphylococcus aureus*, *Pseudomonas phaseolicola*, and *Xanthomonas phaseoli* at a concentration of 38 parts per million, and complete control of *Escherichia coli* at 86 parts per million.

EXAMPLE 17

The hydroxyarylthio composition of the formula

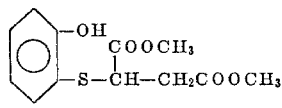

exhibited complete control of the bacteria *Staphylococcus aureus*, at a concentration of 255 parts per million and complete control of *Pseudomonas phaseolicola* at a concentration of 76 parts per million.

EXAMPLE 18

The hydroxyarylthio composition of the formula

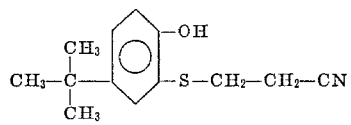

exhibited complete control of the bacteria *Staphylococcus aureus* and *Pseudomonas phaseolicola* at a concentration of 38 parts per million and complete control of *Xanthomonas phaseoli* at 76 parts per million.

EXAMPLE 19

The hydroxyarylthio composition of the formula

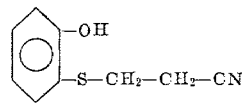

killed 80 percent of the Mexican bean beetle at a concentration of 1000 parts per million.

EXAMPLE 20

The hydroxyarylthio composition of the formula

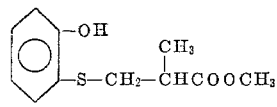

killed 40 percent of the Mexican bean beetle at a concentration of 1000 parts per million.

EXAMPLE 21

To 19.5 parts of o-mercaptophenol and 0.7 part of triethylenediamine, 15 parts of methylmethacrylate were added. After stirring overnight, a light yellow oil was isolated. The product was identified as o-hydroxyphenyl 2-carbomethoxypropyl sulfide, and 5 parts of it were dissolved in about 80 parts of methyl ethyl ketone. To the resulting solution, 8.6 parts of anhydrous potassium carbonate and 0.05 part of powder copper were added. The mixture was heated at reflux for about 30 minutes, and to it, 5.27 parts of O,O-diethyl phosphorochloridothioate was added over a 10 minute period. The mixture was heated to reflux for about 2 hours, cooled and filtered. About five parts of O,O-diethyl o-(2 - (2-carbomethoxypropylthio)-phenyl) phosphorothioate was collected.

Said products of the formula

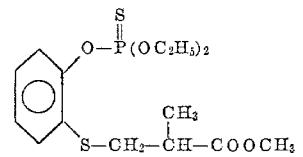

exhibited complete control of the bacteria *Staphylococcus aureus* at a concentration of 255 parts per million. At a concentration of 1000 parts per million 100 percent of the Mexican bean beetles, 100 percent of the mites and 94 percent of the aphids were killed. At a concentration of 125 parts per million 100 percent of the houseflies were knocked down after two hours and 70 percent were killed at the end of 24 hours.

In Examples 22–28 phosphorothioate derivatives of the hydroxyarylthio compositions of the present invention were prepared in a manner similar to Example 21 and were tested for pesticidal activity.

EXAMPLE 22

The phosphorothioate derivative of the formula

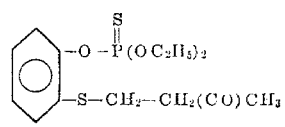

at a concentration of 1000 parts per million, killed 100 percent of the mites and knocked down 100 percent of the flies within two hours and killed 100 percent of the houseflies in 24 hours.

EXAMPLE 23

The phosphorothioate derivative of the formula

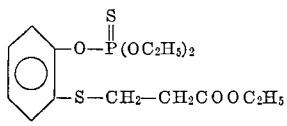

killed 100 percent of the mites, knocked down 100 percent of the houseflies and killed 100 percent of the houseflies at a concentration of 1000 parts per million.

EXAMPLE 24

The phosphorothioate derivative of the formula

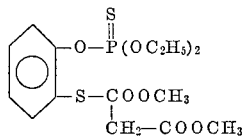

killed 100 percent of the mites, knocked down 100 percent of the houseflies and killed 100 percent of the houseflies at a concentration of 1000 parts per million.

EXAMPLE 25

The phosphorothioate derivative of the formula

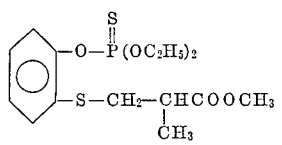

killed 91 percent of the aphids, 75 percent of the mites, knocked down 80 percent of the flies and killed 30 percent of the flies at a concentration of 1000 parts per million.

EXAMPLE 26

The phosphorothioate derivative of the formula

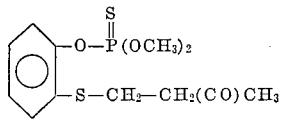

exhibited complete control of the bacteria *Staphylococcus aureus*, *Pseudomonas phaseolicola* and *Xanthomonas phaseoli* at a concentration of 255 parts per million.

EXAMPLE 27

The phosphorothioate derivative of the formula

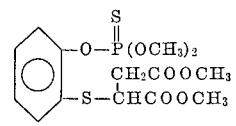

exhibited complete control of the bacteria *Pseudomonas phaseolicola* at a concentration of 255 parts per million, killed 61 percent of aphids at a concentration of 1000 parts per million and killed 70 percent of the flies at a concentration of 1000 parts per million.

EXAMPLE 28

The phosphorothioate derivative of the formula

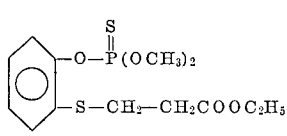

killed 100 percent of the houseflies at a concentration of 1000 parts per million.

The carbamate derivatives of the hydroxyarylthio compositions of the present invention in Examples 29–35 were prepared by adding about 5 to about 10 parts of a composition of a hydroxyarylthio composition to a solution containing about 40 to about 60 parts benzene and about 5 to 10 parts of methyl isocyanate. The benzene and excess methylisocyanate were removed under reduced pressure after about a 2 to 24 hour reaction period.

EXAMPLE 29

The carbamate derivative of the formula

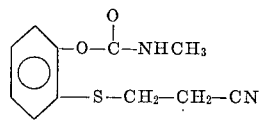

killed 100 percent of the aphids and Mexican bean beetles at a concentration of 1000 parts per million. Said compound knocked down 80 percent of the houseflies and killed 90 percent of the houseflies at a concentration of 1000 parts per million.

EXAMPLE 30

The carbamate derivative of the formula

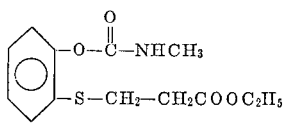

exhibited complete control of *Pseudomonas phaseolicola* and *Xanthomonas phaseoli* at a concentration of 255 parts per million. It killed 100 percent of the aphids and 60 percent of the Mexican bean beetles at a concentration of 1000 parts per million and knocked down 80 percent and killed 60 percent of the houseflies at the same concentration.

EXAMPLE 31

The carbamate derivative of the formula

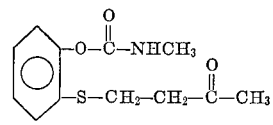

exhibited complete control of *Staphylococcus aureus*, *Pseudomonas phaseolicola*, and *Xanthomonas phaseoli* at a concentration of 255 parts per million.

EXAMPLE 32

The carbamate derivative of the formula

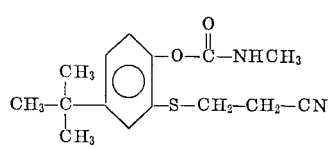

exhibited complete control of *Staphylococcus aureus*, *Pseudomonas phaseolicola*, and *Xanthomonas phaseoli* at a concentration of 255 parts per million and killed 40 percent of the houseflies at a concentration of 1000 parts per million.

EXAMPLE 33

The carbamate derivative of the formula

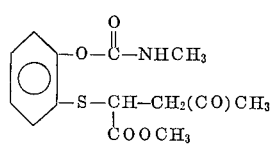

killed 40 percent of the Mexican bean bettles at a concentration of 1000 parts per million.

EXAMPLE 34

The carbamate derivative of the formula

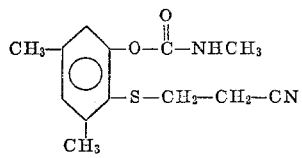

exhibited complete control of *Pseudomonas phaseolicola* at a concentration of 255 parts per million, and killed 53 percent of the aphids and 20 percent of the Mexican bean beetles at a concentration of 1000 parts per million.

While there have been described various embodiments of the present invention, the methods and compositions described are not intended to be understood as limiting the scope of the invention as it is realized that changes therein are possible. It is further intended that each element recited in any of the following claims is to be understood as referring to all equivalent elements for accomplishing substantially the same results in substantially the same or equivalent manner. It is intended to cover the invention broadly in whatever form its principles may be utilized.

We claim:

1. A compound of the formula 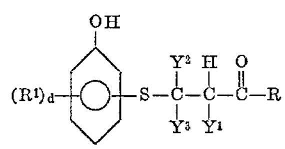 wherein $d$ is zero to 2, inclusive;

R is independently selected from the group consisting of alkoxy of up to 12 carbon atoms;

$R^1$ is independently selected from the group consisting of lower alkyl, lower alkyl thio, lower alkoxy, hydroxy, halo and phenoxy;

$Y^1$ is independently selected from the group consisting of hydrogen and lower alkyl;

$Y^2$ and $Y^3$ are independently selected from the group consisting of hydrogen and lower alkyl.

2. The compound of claim 1 wherein $d$ is from zero to two, inclusive and $Y^1$ and $Y^2$ are independently selected from the group consisting of hydrogen and lower alkyl.

3. The compound of claim 2 wherein R is alkoxy of up to 12 carbon atoms.

4. The compound of claim 2 wherein R is lower alkoxy.

5. The compound of claim 2 wherein $d$ is zero.

6. The compound of claim 2 wherein $d$ is 1.

7. The compound of claim 2 wherein $d$ is 2.

8. The compound of claim 2 wherein $R^1$ is hydrogen.

9. The compound of claim 2 wherein $R^1$ is lower alkyl.

10. The compound of claim 2 wherein $Y^1$ is hydrogen.

11. The compound of claim 2 wherein $Y^2$ is hydrogen.

12. The compound of claim 2 wherein $Y^3$ is hydrogen.

13. The compound of claim 2 wherein $Y^1$ is lower alkyl.

14. The compound of claim 2 wherein $Y^2$ is lower alkyl.

15. The compound of claim 2 wherein $Y^3$ is lower alkyl.

16. A compound of the structure

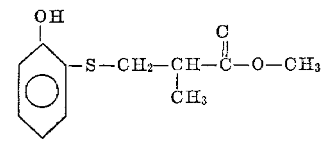

17. A compound of the structure

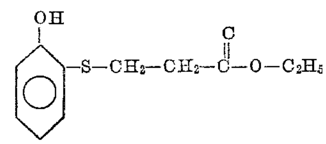

References Cited

UNITED STATES PATENTS

| | | | |
|---|---|---|---|
| 2,828,321 | 3/1958 | Bullock | 260—470 |
| 2,828,322 | 3/1958 | Bullock | 260—470 |
| 3,468,961 | 9/1969 | Geering et al. | 260—609 |

FOREIGN PATENTS

| | | | |
|---|---|---|---|
| 1,369,616 | 7/1964 | France | 260—609 |

OTHER REFERENCES

Chapman et al., J. Chem. Soc., vol. 30, pp. 1520–21, 1965.

ALAN L. ROTMAN, Primary Examiner

U.S. Cl. X.R.

260—250 R, 294.8 G, 294.9, 295 R, 295.5 R, 330.5, 332.2 A, 347.4, 465 F, 479 C, 609 R, 942; 424—250, 266, 274, 275 285, 300, 304

PO-1050
(5/69)

UNITED STATES PATENT OFFICE
CERTIFICATE OF CORRECTION

Patent No. 3,636,074      Dated January 18, 1972

Inventor(s)    Emil J. Geering and Norman W. Dachs

It is certified that error appears in the above-identified patent and that said Letters Patent are hereby corrected as shown below:

Column 2, line 27 (formula)

$$\begin{array}{c} Y \\ | \\ -C = C \\ | \quad | \\ Y^4 \quad Y \end{array} \quad \text{should read} \quad \begin{array}{c} Y^5 \\ | \\ -C = C \\ | \quad | \\ Y^4 \quad Y^6 \end{array} \quad ;$$

line 62, "2 (-hydroxyphenylthio)" should read ---2-(2-hydroxyphenylthio)---. Column 3, line 6, "2,6-dis" should read ---2,6 bis---; line 67, "cinnamaledehyde" should read ---cinnamaldehyde---. Column 4, line 6, "methylthioaceylate" should read methylthioacetylate---; line 35 (formula)

$$\begin{array}{c} \text{"} \quad S-A-(R^1)_d \quad \text{"} \\ \text{"} \\ OH \end{array} \quad \text{should read} \quad --- \begin{array}{c} S-A-(R^1)_d \\ | \\ OH \end{array} \quad ---.$$

Column 7, line 61, "86 parts" should read ---76 parts---. Column 10, line 13, $$\begin{array}{c} \text{"} \quad O \quad \text{"} \\ | \\ O-C- \end{array} \quad \text{should read} \quad -- \begin{array}{c} O \\ || \\ O-C- \end{array} \quad ---.$$

Column 12, line 20, $$\begin{array}{c} \text{"} \quad -S-CH_2-CH-C-O-C_2H_3 \quad \text{"} \\ | \qquad || \\ CH_3 \quad C \end{array} \quad \text{should read} \quad --- \begin{array}{c} -S-CH_2-CH-C-O-C_2H_3 \\ | \qquad || \\ CH_3 \quad O \end{array} \quad ---;$$

line 27, " $-S-CH_2-CH_2-C-O-C_2H_5$ " should read --- $-S-CH_2-CH_2-\overset{\overset{O}{||}}{C}-O-C_2H_5$ ---.

Signed and sealed this 13th day of June 1972.

(SEAL)
Attest:

EDWARD M. FLETCHER, JR.
Attesting Officer

ROBERT GOTTSCHALK
Commissioner of Patents